Z. RIDDLE AND N. F. WILKINS.
AIR BRAKE APPARATUS.
APPLICATION FILED DEC. 22, 1916. RENEWED APR. 22, 1919.

1,312,357.

Patented Aug. 5, 1919.
3 SHEETS—SHEET 3.

WITNESSES
J. H. Crawford.
J. J. McCarthy

INVENTOR
Zala Riddle,
N. F. Wilkins,
BY Victor J. Evans
ATTORNEY

UNITED STATES PATENT OFFICE.

ZALA RIDDLE AND NORMAN F. WILKINS, OF DUNSMUIR, CALIFORNIA.

AIR-BRAKE APPARATUS.

1,312,357.   Specification of Letters Patent.   Patented Aug. 5, 1919.

Application filed December 22, 1916, Serial No. 138,460. Renewed April 22, 1919. Serial No. 291,953.

*To all whom it may concern:*

Be it known that we, ZALA RIDDLE and NORMAN F. WILKINS, citizens of the United States, residing at Dunsmuir, in the county of Siskiyou and State of California, have invented new and useful Improvements in Air-Brake Apparatus, of which the following is a specification.

This invention relates to improvements in air brake apparatus, and has particular application to means for varying the pressure in the brake cylinder.

In carrying out the present invention, it is our purpose to provide means whereby the pressure in the brake cylinder may be varied in accordance with the load on the car so that the brake may be applied to the wheels under a pressure commensurate with the load on the car.

It is also our purpose to provide means of the class described which will be in open communication with the brake cylinder and adjustable to vary the pressure in the cylinder, and which will embody comparatively few parts and these so arranged and correlated as to reduce the possibility of derangement to a minimum.

With the above and other objects in view, the invention consists in the construction, combination, and arrangement of parts hereinafter set forth and falling within the scope of the claims.

In the accompanying drawings:—

Fig. 7 is a detail enlarged sectional view approximately on the line 7—7 of Fig. 1.

Figure 1:
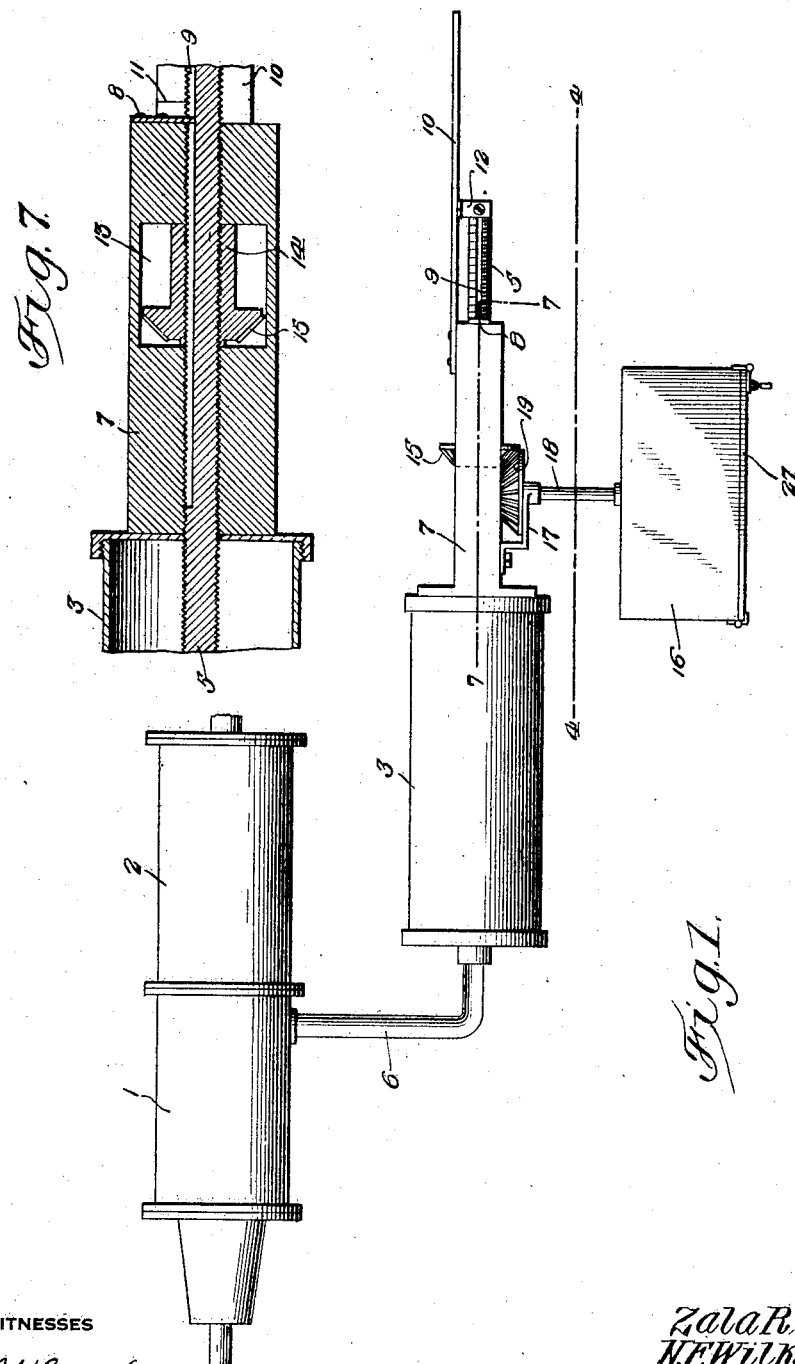
Figure 1 is a top plan view of a brake cylinder and auxiliary reservoir, showing our invention applied thereto.
Figure 2:
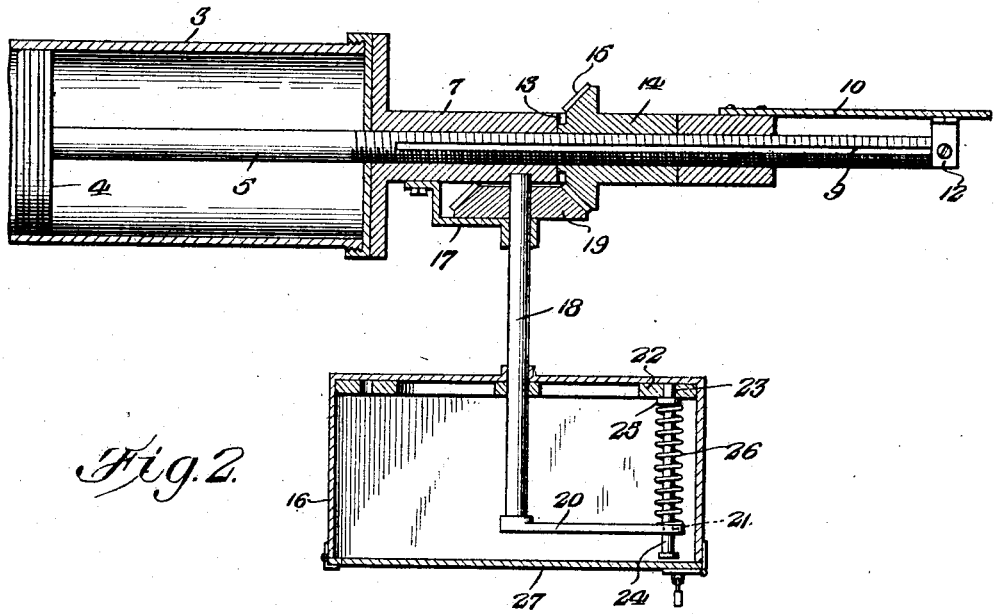
Fig. 2 is a horizontal sectional view through the same.
Figure 4:
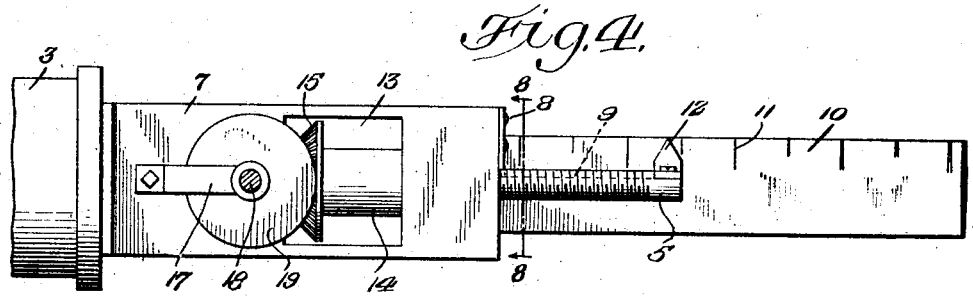
Fig. 4 is a sectional view on the line 4—4 of Fig. 1, the parts being shown in elevation.
Figure 8:
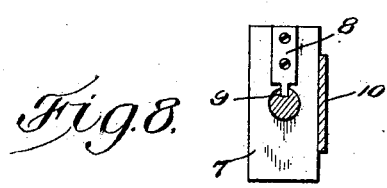
Fig. 8 is a sectional view approximately on the line 8—8 of Fig. 4.
Figure 6:
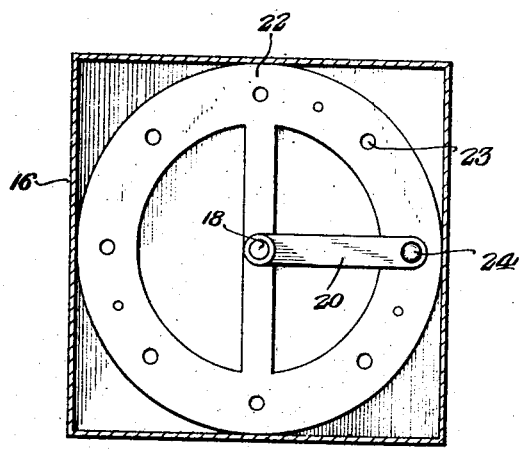
Fig. 6 is a similar view taken at right angles to Fig. 5.
Figure 5:
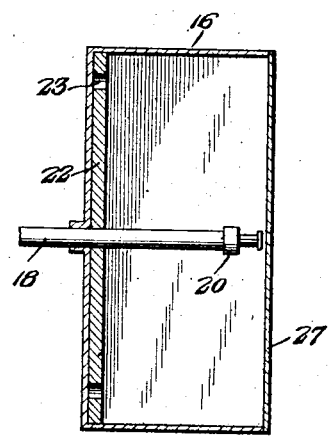
Fig. 5 is a vertical sectional view through the crank box.
Figure 3:
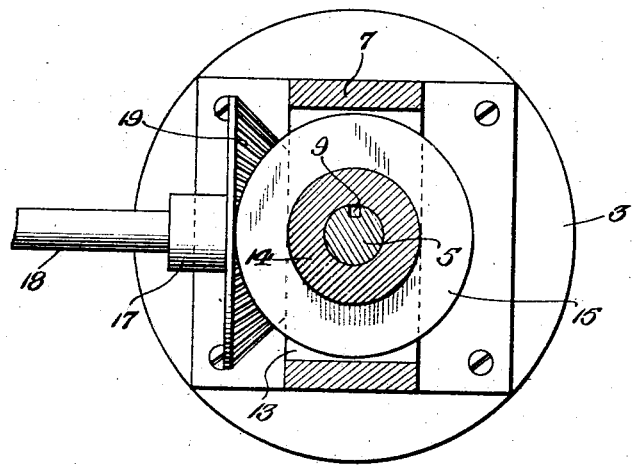
Fig. 3 is a cross sectional view through the piston rod and guide therefor.

Referring now to the drawings in detail, 1 designates a brake cylinder while 2 indicates an auxiliary reservoir connected with the brake cylinder and adapted to supply the latter with air to effect an application of the brakes, as is well known. Arranged adjacent to the brake cylinder 1 is a cylinder 3 in which is mounted a piston 4 equipped with a piston rod 5 extending outwardly through one end of the cylinder and screw threaded for its entire length. The end of the cylinder 3 remote from the piston rod 5 is in open communication with the brake cylinder 1 through the medium of a pipe 6. Connected to the piston rod end of the cylinder 3 is a guide block 7 formed with an opening through which the rod 5 projects, and secured to the outer end of the guide block 7 is a key 8 engaging in a slot 9 formed in the rod 5 and extending longitudinally thereof, the key acting to hold the piston rod against rotary movement. Connected to the outer end of the block 7 and projecting therefrom, is a strip 10 having a linear scale 11 inscribed thereon, and fixed to the outer end of the rod 5 and coöperating with the scale 11 is a pointer 12. The guide block 7 is formed with an opening 13 and surrounding the rod 5 is a threaded collar 14 working within the opening 13 and having one edge formed with bevel teeth 15. 16 designates a crank box disposed at one side of the guide block 7 and journaled in one wall of the box and in a bearing bracket 17 carried by the guide block 7 is a shaft 18. Fixed upon one end of the shaft 18 is a bevel pinion 19 meshing with the bevel teeth 15 on the collar 14. The other end of the shaft 18 extends through the crank box 16 and is equipped with an arm 20 arranged at right angles to the shaft and having the outer end thereof formed with an opening 21. Secured to the inner side of the rear wall of the crank box is an annulus 22 arranged concentrically of the shaft 18 and formed with openings 23 spaced apart equal distances around the annulus. Mounted in the opening 21 in the arm 20 is a rod 24 having the inner end thereof formed with a head 25, and surrounding the rod 24 between the head 25 and the arm 20 is a coiled expansion spring 26 acting to force the head 25 against the annulus 22 to engage the adjacent opening 23 so that the shaft 18 will be held against movement. The outer side of the crank box 15 is provided with a hinged cover 27 adapted to be locked in closed position and capable of movement to open position.

In practice, when the piston 4 is at the end of the cylinder 3 remote from the end through which the piston rod projects, the air in the brake cylinder is prevented from flowing into the cylinder 3, thereby enabling such air to exert the maximum pressure upon the piston in the brake cylinder so as to apply the brakes to the wheels with the maximum force. When, however, it is desired to change the pressure of the air on the piston in the brake cylinder, the rod 24 is pulled outwardly against the action of the spring 26, thereby forming a crank handle for the shaft 18. The shaft may now be rotated to revolve the collar 14, and as the collar is rotated on the piston rod, the latter is moved longitudinally to draw the piston away from the end of the cylinder 3 connected with the brake cylinder, thereby increasing the space for the air let into the brake cylinder so that less pressure will be exerted upon the piston in the brake cylinder. The pointer 12 on the outer end of the piston rod and the scale over which the pointer is movable coöperate to indicate the position of the piston in the cylinder 3, so that more or less space may be provided for the expansion of the air in the brake cylinder. After the piston has been moved to the desired position, the rod 24 is released and the spring 26 reacts to move the head into engagement with the adjacent opening 23 in the annulus 22 thereby holding the parts in adjusted position.

From the foregoing description taken in connection with the accompanying drawings, it will be seen that we have provided means whereby the air may be permitted to act upon the piston in the brake cylinder with more or less pressure according to the load on the car.

While we have herein shown and described the preferred form of our invention by way of illustration, we wish it to be understood that we do not limit or confine ourselves to the precise details of construction herein described and delineated, as modification and variation may be made within the scope of the claims and without departing from the spirit of the invention.

We claim:—

1. The combination with a brake cylinder, of a second cylinder connected with said brake cylinder and in open communication therewith, a piston in said second cylinder, a piston rod connected to said piston and projecting outwardly through one end of the second cylinder, a sleeve threaded onto said piston rod and rotatable thereon to slide the piston rod longitudinally to change the position of the piston in the cylinder whereby the space for the expansion of the air in the brake cylinder may be increased or decreased, and manually operable means for rotating said sleeve.

2. The combination with a brake cylinder, of a second cylinder connected with said brake cylinder and in open communication therewith, a piston in said second cylinder, a piston rod connected to said piston and projecting outwardly through one end of the second cylinder, a sleeve threaded onto said piston rod and rotatable thereon to slide the piston rod longitudinally to change the position of the piston in the cylinder whereby the space for the expansion of the air in the brake cylinder may be increased or decreased, manually operable means for rotating said sleeve, and a casing inclosing said manually operable means.

3. The combination with a brake cylinder, of a second cylinder connected with said brake cylinder and in open communication therewith, a piston in said second cylinder, a piston rod connected to said piston and projecting outwardly through one end of the second cylinder, a sleeve threaded onto said piston rod and rotatable thereon to slide the piston rod longitudinally to change the position of the piston in the cylinder whereby the space for the expansion of the air in the brake cylinder may be increased or decreased, manually operable means for rotating said sleeve, and means associated with said piston rod for indicating the position of the piston in said cylinder.

In testimony whereof we affix our signatures.

ZALA RIDDLE.
NORMAN F. WILKINS.